July 5, 1932.  C. WILLIAMSON  1,866,438
SUBMARINE APPARATUS
Filed April 11, 1927   7 Sheets-Sheet 3

INVENTOR
Charles Williamson
BY
ATTORNEY

July 5, 1932.    C. WILLIAMSON    1,866,438
SUBMARINE APPARATUS
Filed April 11, 1927    7 Sheets-Sheet 4

INVENTOR
Charles Williamson
BY
ATTORNEY

July 5, 1932. C. WILLIAMSON 1,866,438
SUBMARINE APPARATUS
Filed April 11, 1927 7 Sheets-Sheet 5

INVENTOR
Charles Williamson
ATTORNEY

Patented July 5, 1932

1,866,438

UNITED STATES PATENT OFFICE

CHARLES WILLIAMSON, OF PERTH AMBOY, NEW JERSEY

SUBMARINE APPARATUS

Application filed April 11, 1927. Serial No. 182,735.

My invention relates to apparatus for performing or facilitating practically every variety of submarine operations, including under-water inspection and repair of ships' hulls and appurtenances, exploration and mining or analogous operations, location and salvaging of sunken vessels or their cargoes, and other operations too numerous to mention. The apparatus greatly facilitates such operations as have heretofore been conducted in relatively shallow waters by the aid of caissons, diving bells or the conventional diving armor, but a very important feature of the invention is to provide practical apparatus for exploring, mining and salvaging operations and the like at depths much greater than those at which any such operations have heretofore been possible. My apparatus therefore provides for gaining access to and recovering valuables, such as specie or other valuable cargoes of ships sunk at relatively great depths and which have hitherto been entirely inaccessible.

The invention is based on the general premise that efficient under-water operations at practically any depth require easy and comfortable close approach to the point of operations, not only by workmen, such as divers, but by inspectors, experts or engineers, under what I call normal conditions, as sufficiently explained below, so that the trained experts in charge of operations may have, by direct observation, knowledge of conditions and may therefore intelligently direct the operations without having to depend upon reports from workmen, such as divers, who, however, well trained they may be in the art of moving and working under the onerous conditions imposed by conventional diving armor, are evidently unqualified as a rule to expertly analyze conditions or efficiently direct operations from an engineering standpoint.

To provide for this essential, easy access to the point of operation, I provide, as the principal feature of my apparatus, a tubular structure of indefinitely variable length and also having various other variable characteristics to adapt it for various particular purposes or conditions, as fully pointed out hereafter, this tube being so constructed as to properly withstand hydrostatic pressure at various depths and to be formed or placed in any desirable or necessary position with one end at the surface and the other end submerged and in proximity to the working location, so that inspectors, engineers or workmen may easily pass through the tube to and from the working point and remain there under practically normal atmospheric pressure for practically any normal or reasonable working hours and without limitations on endurance imposed by the usual submarine apparatus, such as diver's armor in which the operator is subjected to atmospheric pressure equal to that of the surrounding depth of water.

The tube is constructed in various units and working sections or subsections, and includes different forms of means for automatically adjusting itself with relation to hydrostatic pressure, or more particularly stated, means by which the various units or sections will automatically collapse longitudinally while maintaining their circumferential resistance to entry of water, the degree of collapse being entirely regulated by hydrostatic pressure, so that the sections and the tube as a whole are automatically stabilized and automatically adapted to the hydrostatic pressure at every depth; means rendering the tube, its sections or units, flexible or bendable so that it may be placed in practically any position or condition of curvature to suit the work in hand; means or units or sections of special form to limit or regulate the amount of longitudinal collapse and thus to regulate or vary the weight per linear foot of the tube, in any part of its length, in a different manner from such regulation as is afforded in other of the units or sections by their arrangement to collapse partly or completely in direct response to hydrostatic pressure; means for properly supporting the upper end of the tube; means at the lower end of the tube for accommodating leaders and workmen, and permitting inspection of the work; means for illuminating the surrounding water; means by which workmen within the working chamber at the lower end may operate tools or manipulate objects outside such chamber; and various other features explained in detail below.

The accompanying drawings show apparatus embodying the invention in certain representative forms. After considering these examples, skilled persons will understand that many variations may be made within the principles disclosed, and I contemplate the employment of any structures that are properly within the scope of the appended claims.

Figures 1, 2, 3, 4, 5:
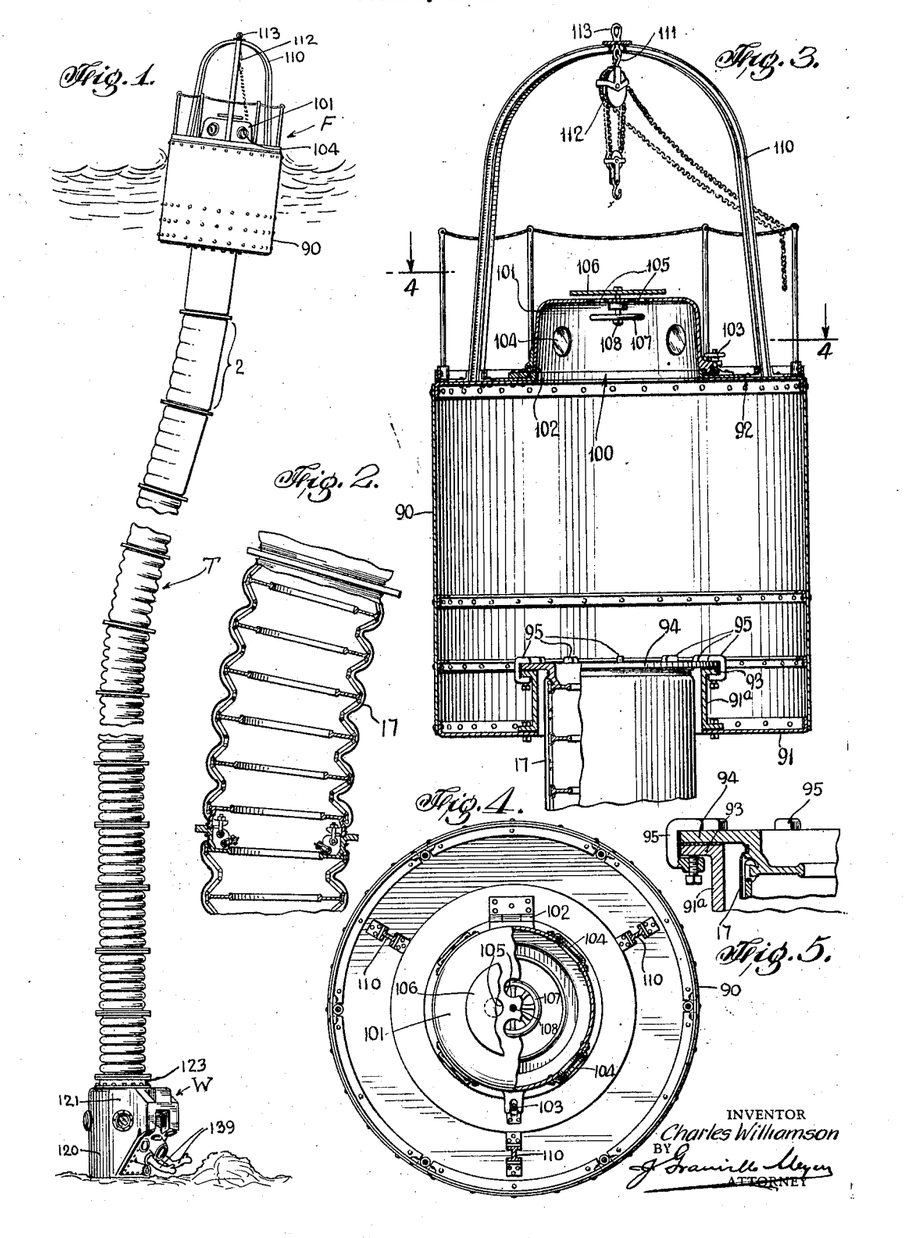
Fig. 1 is an elevation of apparatus embodying the invention in one form, a part of the tube being broken away.
Fig. 2 is an enlarged vertical section through a part of the tube.
Fig. 3 is a vertical section of one form of upper chamber or float, showing also the upper end of the tube and one arrangement for connecting the tube to such upper chamber.
Fig. 4 is a section at 4—4, Fig. 3.
Fig. 5 is an enlarged sectional detail of a clamp, shown in Fig. 3.

For a great variety of operations the apparatus desirably includes three principal parts or groups of parts, namely, a tube T, Fig. 1, a float or upper chamber F and a lower or working chamber W. Any of these parts, and especially the tube T, in its various formations, may be used alone or in combination with one of the other parts; thus, in some cases the tube T may be employed with a working chamber such as W, but without the float F. The apparatus will first be described as consisting of the three principal parts or groups just referred to and some variations in the general structure of group arrangements will be referred to later by way of example.

Figures 6, 7, 8:
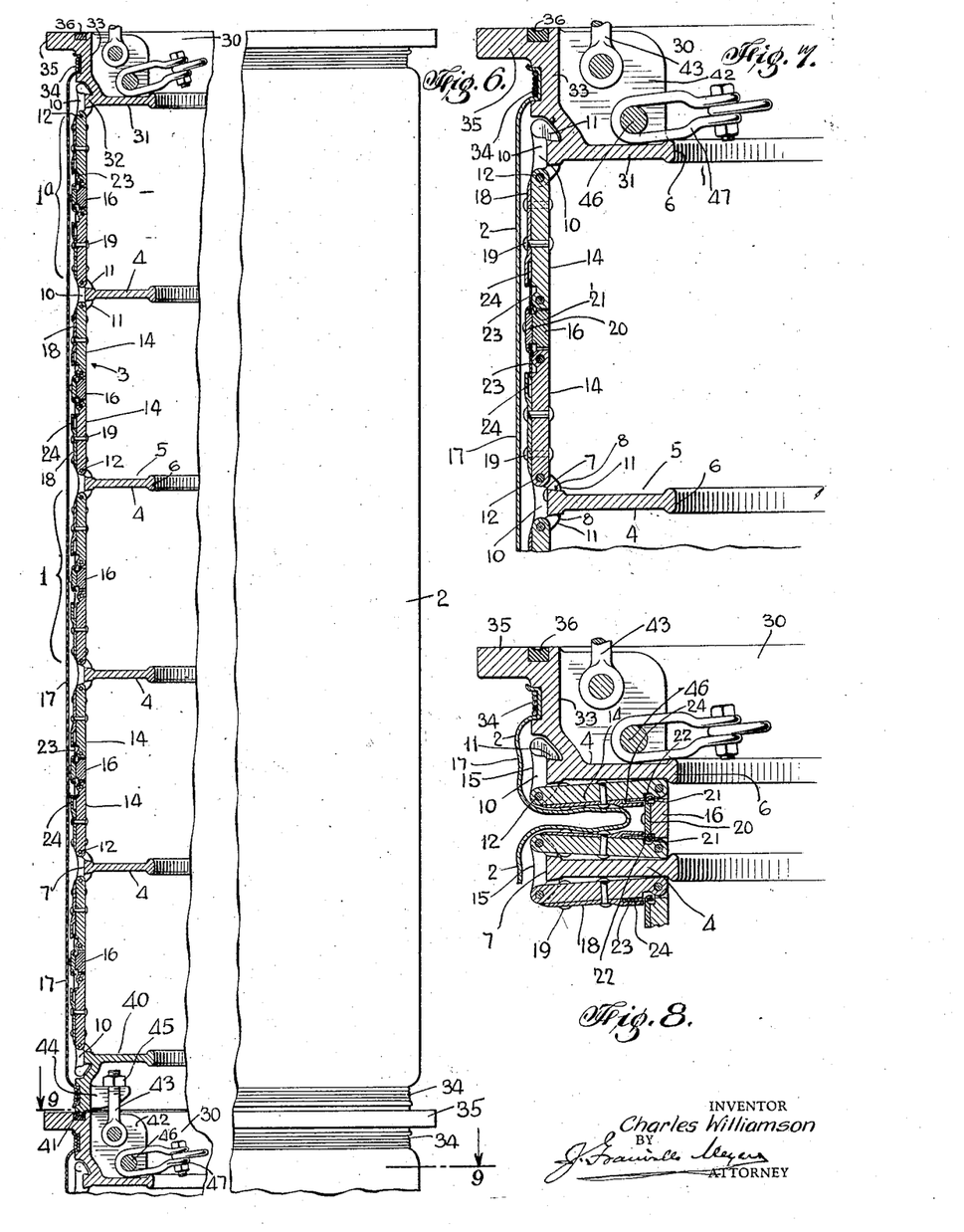
Fig. 6 is a view in larger scale, partly in elevation and partly in vertical section, of what I call a "working section", composed of a plurality of subordinate assemblies called for convenience, "units".
Fig. 7 is a partial axial section in still larger scale of one of the units and a section end piece, connector or frame.
Fig. 8 is a similar view showing the unit in completely collapsed position.

In order to adapt my system or apparatus to almost every conceivable submarine operation, to provide for compactness and economy of storage, and easy assembly of the tube in variable forms or combination at the scene of operations, and for other reasons, the tube T is preferably composed of collapsible units, such as 1. Figs. 1 and 6, and desirably, also, practically any number of these units may be connected together to form a working section, such as 2, and any number of working sections may be connected together to form a tube T of practically any length required for a particular operation.

I will first describe this particular form of working section consisting of similar units and will then show that many variations may be made in the sections and units, these variations including provision for building up working sections composed of units of different types.

Figures 9, 10, 11:
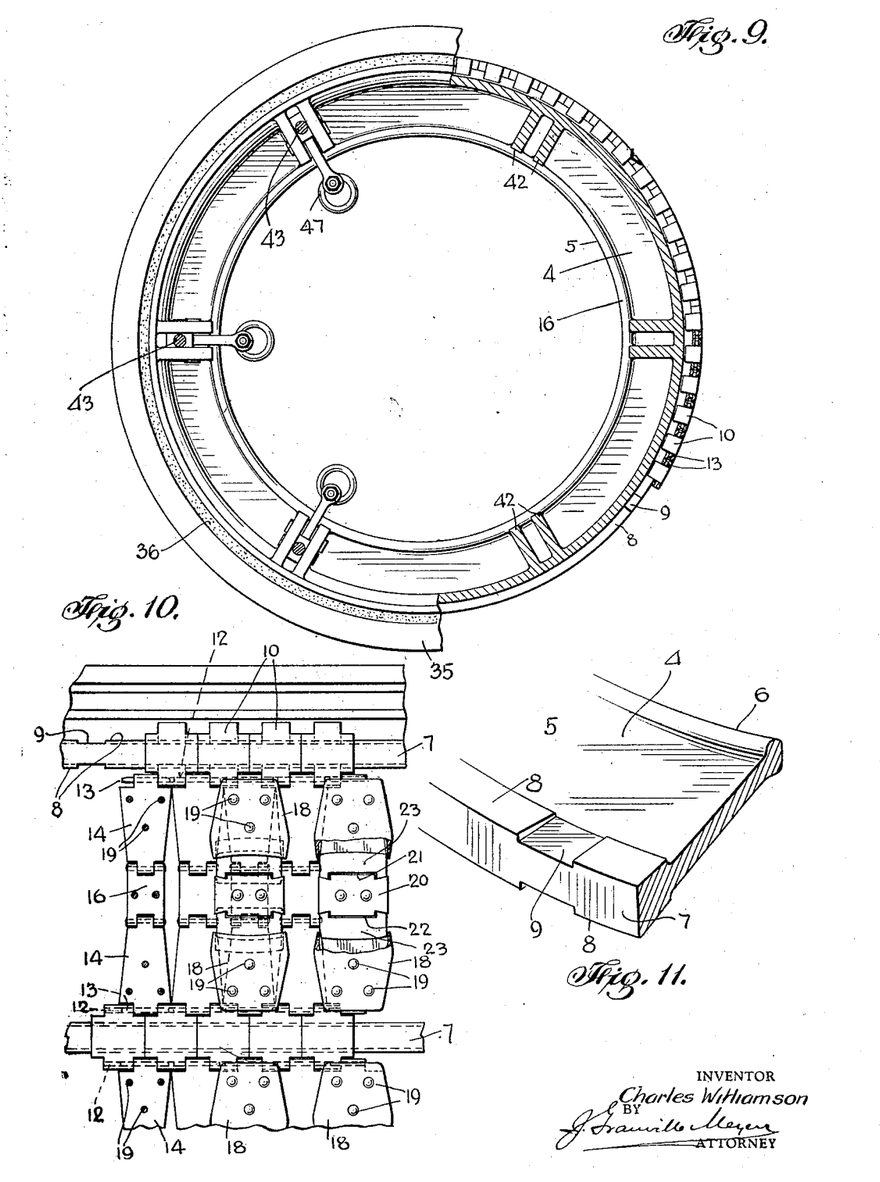
Fig. 9 is a section at 9—9, Fig. 6.
Fig. 10 is a side elevation of segments of adjacent units showing especially the collapsible link construction.
Fig. 11 is a fragmentary detail of one form of intermediate frame or ring.

Each unit, such as 1, Fig. 6, which is conveniently identified as an intermediate unit, consists of a wall 3 composed of articulated links, and one or two of the frames or rings 4 which may otherwise be identified as pivot block frames. Since each of these frames is common to two adjacent sets of links a unit may be said to consist of a set of links and one of the frames. Each frame (see also Fig. 11) consists of a horizontal web 5 terminating in a circular head or bead 6, these rounded beads affording a comfortable and secure hand grip and foot support equivalent to the rungs of a ladder, by which operatives may easily climb up and down through the tube. The outer periphery of each ring or frame is formed with a cylindrical outer face 7 and inclined upper and lower faces 8, notched at one or more points of the periphery as at 9. Pivot blocks 10 are provided, having jaws 11, the inwardly presented faces of which are beveled or tapered to correspond with ring faces 8. The blocks are bored as at 12 to receive pivot pins 13 of the upper and lower links 14 and the outer faces 15 of the blocks are curved for a purpose explained below. In assembling a unit, a pivot block is applied to the ring or frame 4 by passing its jaws 11 in through the slots 9 and then moving the pivot block around to a convenient point away from the slots; a set of links consisting of upper and lower links 14 and a middle link 16 is then connected by inserting the tapered pivot pins 13 of one of the end links in one of the pivot holes 12; another pivot block is applied and moved around until the opposite pivot pin 13 enters its pivot hole, and the process is repeated until a complete set of links has been positioned for forming a collapsible circumferential wall.

Two or more adjacent units are connected together in a similar manner to form a working section, such as 2, of any desired number of units. The upper and lower links 14 have their edge faces flared upward and the inward end of each of these links is hingedly connected to ends of the center link 16, whose width is the same as that of the inward ends of the upper and lower links, thus providing that the side edges of adjacent links will closely meet when in folded position, as in Fig. 8.

To provide a secure and substantially continuous base for the water-tight sheathing, such as tube 17 of rubberized canvas or other suitable material, Fig. 6, alternate sets of links are provided with face plates; thus the upper and lower links 14 of each alternate set have on their outer faces, plates 18 secured by rivets 19, these being laterally dimensioned to overlap the adjacent center link and have at their upper and lower edges, hinge hook formations 21 engaging in slots 22 of plates 23 which are arranged to slide in pockets 24 formed in the inward ends of plates 18. In this way in any position of the links they present a substantially smooth outer surface for the support of the water-proof sheathing. This surface is cylindrical when the links are fully extended and becomes annularly concave as they are partly folded (Figs. 13 and 14) and finally when fully folded, Fig. 8, the center plates 20 present a shallow cylindrical surface and the upper and lower plates 18 are substantially horizontal, the hinged or sliding plates 23 being fully telescoped in the pockets 24.

Figure 16:
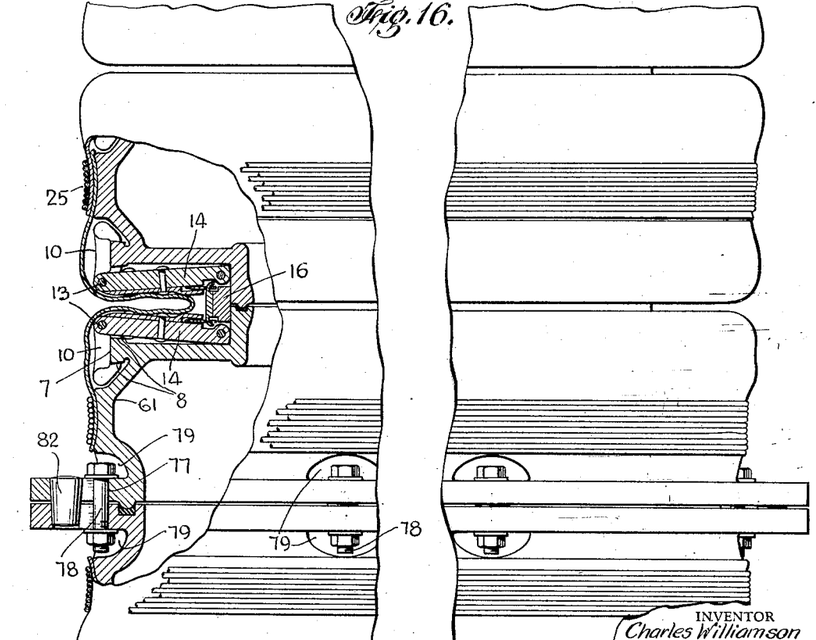
Fig. 16 is substantially similar to Fig. 15 but showing also a rigid unit arranged as an end frame of a working section and two of such end frames connected together.
Figure 17:
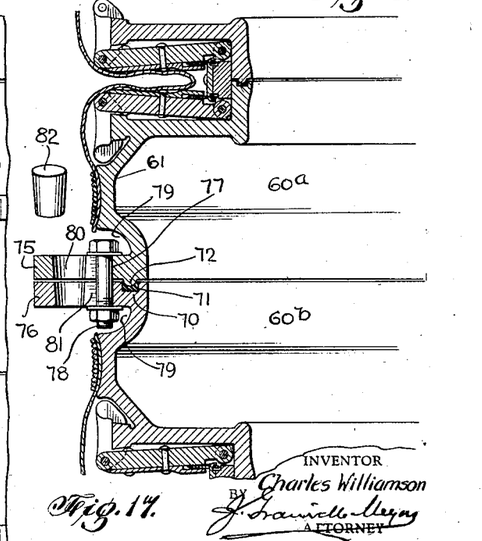
Fig. 17 shows portions of two connected sections, similar to those of Fig. 16.
Figure 19:
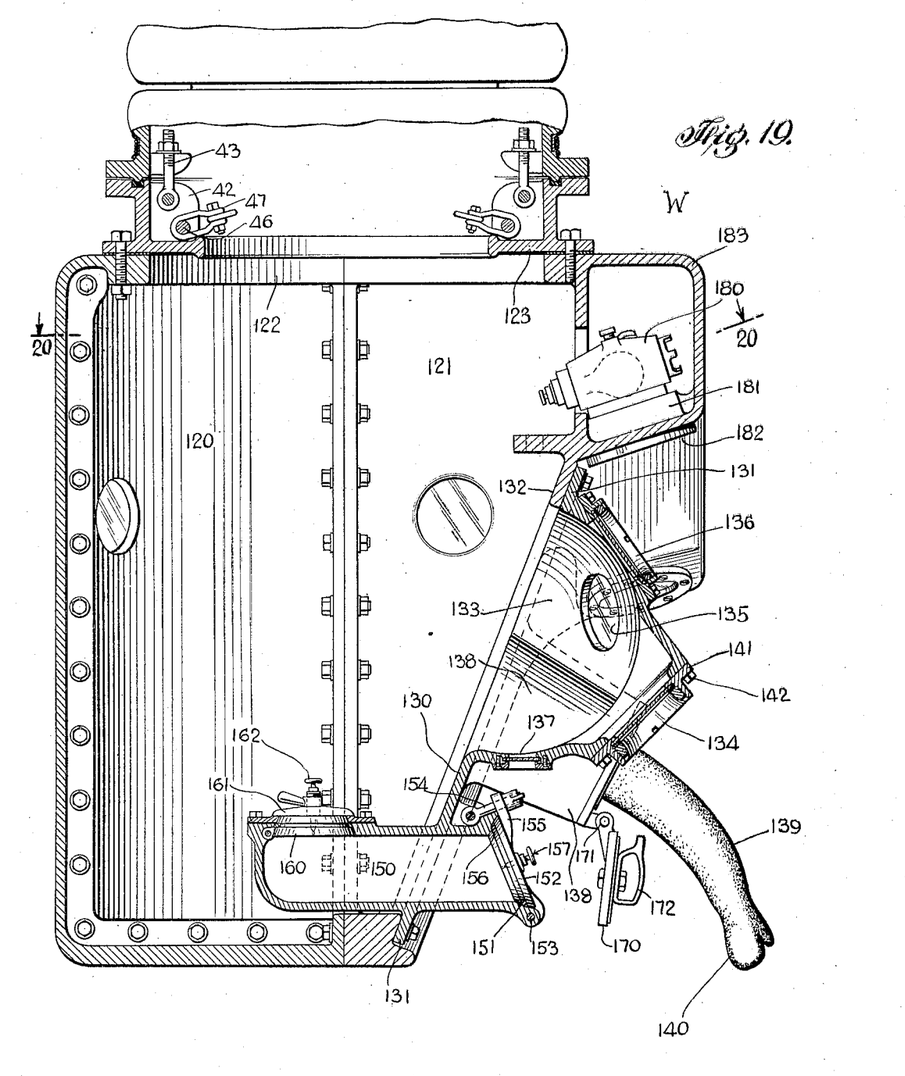
Fig. 19 is a vertical section of one form or type of terminal working chamber.
Figure 20:
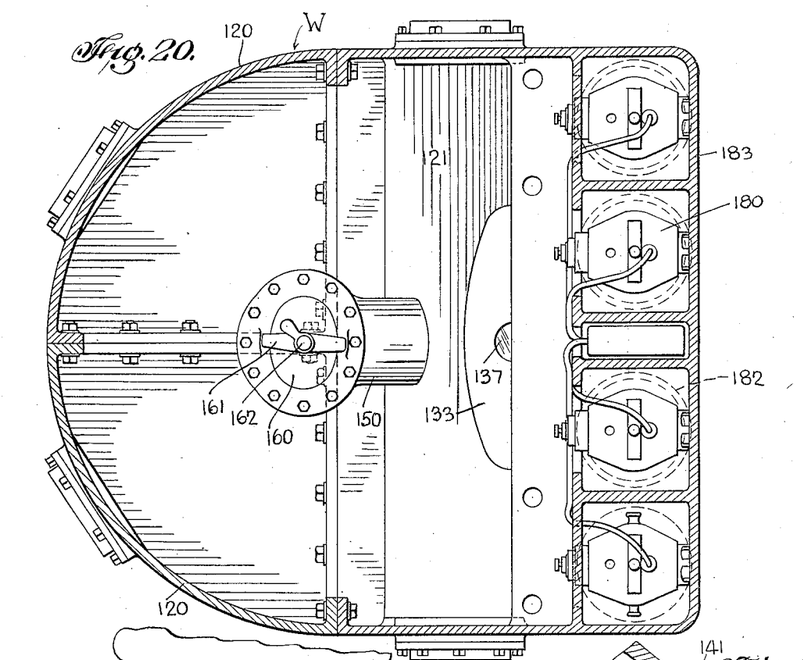
Fig. 20 is a horizontal section at 20—20, Fig. 19.

The curved or concaved outer faces 15 of the pivot blocks afford a convenient base for lashings, such as 25, Fig. 16, when separate water-tight sheathing is used for the individual units.

The link construction is such that the unit will not only collapse by straight axial movement accompanied by equal inward displacement of all of the link members, but the upper and lower frames 4 of any unit may be angularly positioned in relation to each other, as sufficiently shown in Fig. 2 and in such cases the linkage at one side of the unit is collapsed in proportion to the angular deflection of the frames, the links at the opposite side are relatively more extended or straight and at every intermediate point there is an intermediate deflection, these varying positions of the links being permitted by the slight play or clearance provided in hinge connections and especially by the tapered pivot pins 13 of the upper and lower links. Thus, even a slight relative tilting of the frame members of several adjacent sections provides for practically any desired degree of curvature of the tube, which may therefore by means of tackle be bent to any suitable curvature, as for example, around the bilge of a ship's hull, or in rough or tidal waters the upper portion of the tube may swing or bend to accommodate such movements of the water without imposing strain upon the tube to needlessly resist such movements, and without disturbing the working chamber at the lower end.

For practical convenience it is desirable in many cases to arrange the units in working sections which may easily be coupled together in forming a tube of any desired length; thus, a representative working section 2 in Fig. 6, consists of five units constructed as above described. At the upper end is a frame 30, which I identify as a connecting or section frame in distinction from the unit frames or rings 4. Each of the frames 30 includes a horizontal web 31 having a peripheral part 32 to receive the upper pivot blocks for the links of the upper unit and otherwise shaped in substantial agreement with one of the intermediate frames or rings 4. It also has an outer cylindrical wall 33 grooved at 34 to receive a lashing for the sheathing 17. This wall terminates in a flange 35 channeled to receive a compressible gasket 36. At the lower end of the section is a section or connecting frame 40 similar to frame 30, but having at its lower end instead of a flange, a bead 41 to co-operate with the gasket of the next section frame to which it is connected, as at the bottom of Fig. 6. For the convenient connection of the sections from within the tube, which is desirable in many cases, certain of the adjacent section frames, such as 30, have vertical pairs of lugs 42 and swing bolts 43 pivoted between the lugs. These swing bolts are arranged to swing up between the twin lugs 44 of the adjacent section frame and are then secured by nuts 45. Pins 46 may also be inserted in holes in the lugs 42 to engage any convenient devices, such as clevises, or ends of chains 47 which may be connected to a chain hoist for the convenient manipulation of the section.

It will now be evident that any unit or any section consisting of any convenient number of units may be completely stored in a warehouse or on a vessel such as a barge equipped for salvaging operations. When any section, such as 2, is placed either end up on the floor or upon another section, it will collapse by gravity, the links of any section assuming the position of Fig. 8, and the individual unit or section will evidently take up a minimum amount of space so that a great amount of tube equipment can be stored in a small space. When such assembled sections are provided, a tube is quickly constructed by hitching a tackle to the upper connecting frame, such as 30, of a section and hoisting it, whereupon it will assume extended position. It may then be swung overboard (a working chamber usually being connected to the lower end of the first section, as further referred to hereafter) and supported by tackle or by a suitable frame-work on the barge while another section is positioned on it and secured in a manner sufficiently explained above.

The weight of each collapsible section is preferably so calculated that when in extended form and therefore of maximum cubic volume, the water which it would displace if fully submerged, weighs slightly more than the unit, which would therefore float with its upper end nearly awash or slightly above the surface (assuming the ends to be closed). This slight buoyancy of any unit or working section is overcome by the weight of the working chamber which is attached to the lower end of the tube, so that the tube and working chamber will sink as the tube is being built up to the required length by connection of successive working sections; and finally if the tube is not to remain connected to or suspended from a ship or barge, the upper or float chamber F is connected to the upper end of the tube, this chamber being of such volume that it has ample buoyance and will support the entire apparatus with reasonable submersion of the float, about as indicated in Fig. 1. When the tube is composed in whole or in part of collapsible units, each unit will collapse as it descends by reason of hydrostatic pressure upon its vertical wall, the amount of collapse being proportional to pressure and also to depth, as the pressure increases by 0.444 lbs. per sq. in. per foot of depth. By this progressive or graduated collapse of units any lower portion of the tube becomes relatively heavier per foot of length than any upper section and this imparts to the tube and the entire apparatus desirable and necessary vertical stability, the increased weight of lower tube portions acting practically as a pendulum or sinker. Upper units or sections are also relatively flexible, giving the desired flexibility to that portion of the tube which is relatively near the surface and therefore subjected to bending by the action of waves or tidal currents, while lower portions, located below the zone of disturbance are relatively inflexible.

Figure 13:
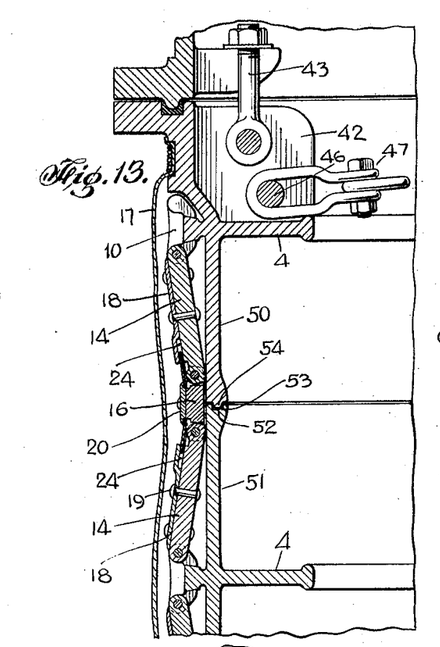
Fig. 13 shows another modification in which means is provided to limit the amount of longitudinal collapse of a unit, or specifically, to permit only a small amount of collapse.

In some cases it is necessary to provide, in connection with collapsible units, means for definitely limiting the amount of collapse. A sufficient reason for such modification is that in some cases where great length of tube is required, if the units are permitted to fully collapse an excessive number of units would be necessary to provide the necessary length of tube; also the increase of weight per linear foot occasioned by complete collapse of the lower units would impose unnecessary strain on upper portions of the tube or upon its point of connection to a ship, barge or float, this increase of weight being in certain cases sufficient to severely strain or possibly break the tube; or when such a tube is suspended from a float such as F, a larger float would be necessary to support the increased tube weight. I, therefore, in some cases, as shown in Fig. 13, arrange the intermediate or section frames with cylindrical walls 50 and 51 located near the peripheries of the horizontal webs 4. The diameter and depth of these walls is such that when the links have collapsed to the desired extent, represented by the slight angular deflection of the upper and lower links in Fig. 13, the center links will engage outer faces of the walls 50 and 51 and at the same time the upper and lower faces of the respective walls will meet, whereupon the unit in question becomes practically rigid, thus the links in their slightly collapsed position are stoutly reenforced and braced by the walls, and moreover by the provision of a channel, such as 52, in one wall with a gasket blank 53 therein and a mating bead 54 on the other wall to compress the gasket, a watertight seal is afforded for the tube at this point and at every similar adjacent unit, this being additional to the outer watertight sheathing, so that if for any reason the outer sheathing is ruptured, the portions of the tube, located in deeper water and therefore in more dangerous positions, are practically secured against any inrush or even seepage of water.

The slight amount of collapse provided for in this structure represents only a slight decrease in the axial dimension of the unit, or in other words, a very slight decrease in its cubic volume and therefore only a slight increase in its weight per axial foot.

Figure 14:
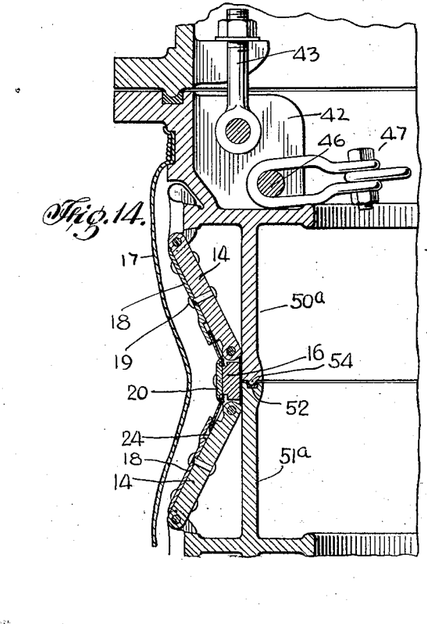
Fig. 14 is another modification of similar principle, the arrangement being to permit a greater degree of unit collapse.

Fig. 14 shows a unit in which the walls 50a, 51a, are located farther inward and are at the same time relatively shallower to provide for a greater amount of unit collapse, as represented by the greater angle of deflection of the upper and lower links 14, but still providing the characteristics and advantages noted in connection with Fig. 13. In this arrangement the axial collapse of the unit is greater than in Fig. 13 and therefore there is a greater reduction in cubic volume and proportional increase in weight per foot length.

Figures 15, 18:
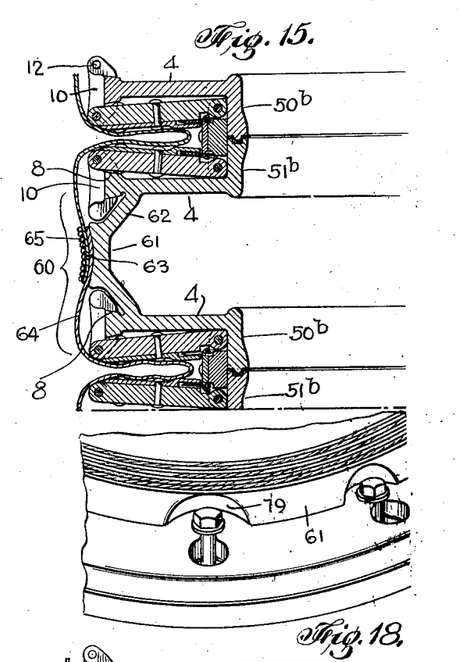
Fig. 15 shows a structure substantially similar to Fig. 13 or Fig. 14 but arranged to permit full collapse of a unit and provide additional support for the foldable linkage when in fully collapsed position, and also showing how a working section may be composed of different types of units, specifically in this figure, being composed of rigid double units and collapsible single units alternately arranged.
Fig. 18 is a fragmentary detail in perspective of section, or section-frame, fastening devices shown in Fig. 16.

Fig. 15 shows still another modification, in which the walls 50b, 51b, are located at the inner peripheries of the horizontal webs 4, and provide for total collapse of the section or unit, with the other characteristics or advantages noted in explaining previous figures. In this arrangement the unit is fully collapsed and its cubic volume reduced to minimum and therefore its weight per axial foot is increased to the maximum. It is now evident that by arranging the walls, such as 50 and 51 in different positions and with different depths, any desired amount of unit collapse may be provided and by using units having different wall arrangements in different portions of the tube, the tube weight per foot may be controlled in practically any way desired.

Figure 12:
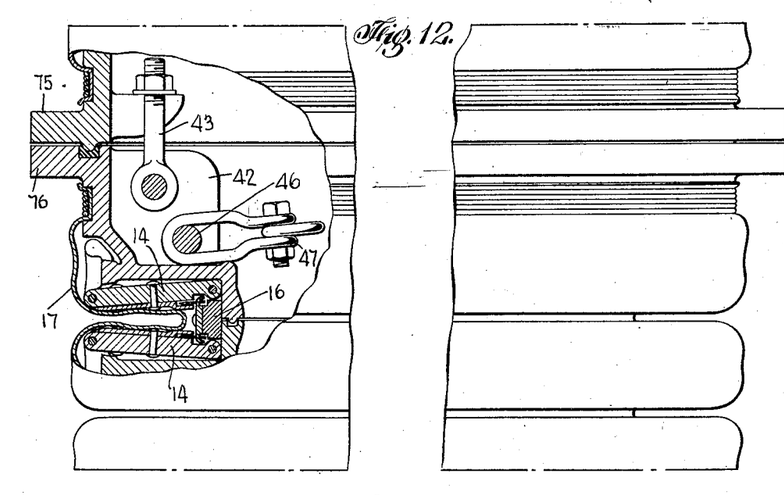
Fig. 12 shows partly in section and partly in elevation a modified type of unit construction arranged to provide additional support for the collapsible linkage when in collapsed position.

For many purposes also, it is unnecessary that all of the sections or units be collapsible. Thus, non-collapsible or rigid units may be provided, such as 60, in Fig. 15, and any number of such units may be connected together or interspaced with collapsible units, as shown in that figure and figures 12 and 16. For the latter purpose the rigid sections or units 60 have horizontal webs 4 with vertical walls 50b, 51b, equivalent to the web and wall members of collapsible units, and the webs 4 are provided with pivot block receiving faces 8 equivalent to those of the intermediate or end frames 4, 30 or 40, Fig. 6, so that pivot blocks 10 may be placed thereon for the connection of a collapsible unit to either or both ends of a rigid unit, as in Fig. 15. To provide the desired length for the rigid unit or section, the webs 4 are spaced apart and connected by an outer wall 61 having portions 62 formed to permit placing pivot blocks in position in the manner previously described. The central portion of the outer face of wall 61 is desirably made concave as at 63 to provide a suitable base for ends of the outer waterproof tubes or casings, such as 64, and to properly retain their lashings 65.

The rigid unit just referred to, is arranged in an intermediate location, that is, not as an end member or working section. Fig. 18, however, shows such rigid frames or units arranged at lower and upper ends respectively of adjacent working sections. Thus, unit 60a is arranged as a lower end or frame member of a working section and connected to a collapsible unit, while unit 60b is arranged as the upper end or unit of another working section and devised for convenient connection to unit 60a.

To provide a water-tight connection, the vertical wall of section 60b is provided with a channel 70 containing a gasket 71 and unit 60a has a bead 72 to enter the channel and compress the gasket. These rigid end frames or units may be arranged for internal connections, as in Figs. 6, 13 or 14, but they otherwise may be arranged for external connection, as illustrated in Fig. 18. For this purpose the respective frames have flanges 75 and 76 provided with bolt holes 77 for bolts 78, and to avoid, so far as possible, increase if an external diameter of the tube, the walls 61 are desirably undercut or provided with recesses 79 to accommodate the bolt heads or nuts. Since this arrangement would prevent endwise insertion of the bolts, the bolt holes 77 are desirably arranged as parts of buttonhole formations comprising outer holes 80 which are clear of the recesses or overhanging portions of the walls 61 and slots 81. The bolts may first be inserted in the outer holes and then moved through the slots to the inner holes in which they are secured and the sections tightly clamped together by screwing up the nuts.

To avoid the possibility of tackle hooks or other fouling objects engaging in the outer holes 80, plugs 82 are provided which may be inserted to close these holes after the bolts are properly positioned and secured, as in Fig. 16.

In some cases the tube may be suspended from a well in a salvaging barge designed for that purpose or supported and moved in relation to the barge or surface ship by a tackle. Otherwise the upper end of the tube may be connected to the upper chamber or float F, Figs. 1 to 5. This is desirably in the form of a tank having a cylindrical side wall 90, bottom 91 and top 92. The bottom is centrally apertured and at this aperture is a tubular fitting 91a terminating in a top flange 93. The upper tube section has at its upper end a frame which may be similar in general to any of the section frames described, such as 30, and this end section frame is provided with a flange 94 resting upon flange 93. The flanges are secured together and the upper tube end is secured to the float by any suitable clamps, such as 95.

In the top 92 is a hatchway 100 to provide for entrance and exit of personnel and also large enough to permit tube sections to be lowered or hoisted through it in lengthening or shortening the tube or in the connection of an upper tube section to the tubular fitting 91a, as just explained. In bad weather the hatchway may be closed by a cylindrical hatch 101 hinged at 102 and secured by a latch or screw bolt such as 103. To provide for light and ventilation when the hatch is closed it has glazed ports 104 and ventilating holes 105 in its top wall and a plate 106 is provided to close these holes when necessary being manipulated from within by a handwheel 107 on screw 108. To facilitate the delivery of tools, etc., to workmen in the working chamber or to remove any heavy material from the working chamber the float desirably has on its top stanchions 110 with a ring bolt 111 directly over the hatch and tube so that chain hoists or other tackle such as 112 may be connected for use in lengthening and shortening the tube as required upon order from workers below. Evidently when the tube is substantially shortened, for example, by insertion of fully collapsible sections, these fully collapsed sections add weight, the effect of which is to pull down the float tank at the surface and if the tube is sufficiently long the tank would be loaded until its upper deck surface is awash; or in other words, more float buoyancy would be required and a larger float would in such a case be connected to the tube. Conversely, if the tube were slacked by insertion of noncollapsible or partially collapsible sections having greater buoyancy per linear foot, the load on the float would be decreased. In view of these conditions the volume of buoyancy of the float tanks is calculated with relation to the length of tube to be used or the particular units of which the tube is composed. The hatchway 100 and the tackle connected to the stanchions is also used for raising and lowering any articles or material through the tube. Another ring or eye 113 is connected to the stanchions for connection of tackle to raise or lower the float.

A great variety of lower or working chambers may be provided for different classes of operations. Variations in construction or arrangement of such chambers are so numerous that it is impracticable to fully describe them and I will therefore describe only the working chamber illustrated, which embodies in one form most of the important features or appurtenances of these chambers.

Since the chamber is frequently to be used at very considerable depths where it is subjected to heavy pressure, and also since it acts in many cases as a vertical stabilizer for the tube in the same fashion as a sinker on a line, and therefore is usually heavier than the water it displaces, the shell or frame of the chamber usually consists of thick-walled castings bolted together with gaskets in the joints to insure water tightness. Thus, in the present example, the chamber consists of two, one-quarter-cylindrical rear sections 120 and a forward section 121. All these sections are formed to provide, when secured together, a top opening 122 with a flange provided with bolt holes for bolting the chamber to the lower end of the tube. To facilitate this attachment or detachment of the chamber, a frame 123 similar to one of the section end frames or connectors may be secured to the chamber, and this is provided with swing bolts for connection to a complemental section end frame such as 30 of Fig. 6, this being the lower end of the tube.

Figures 21, 22:
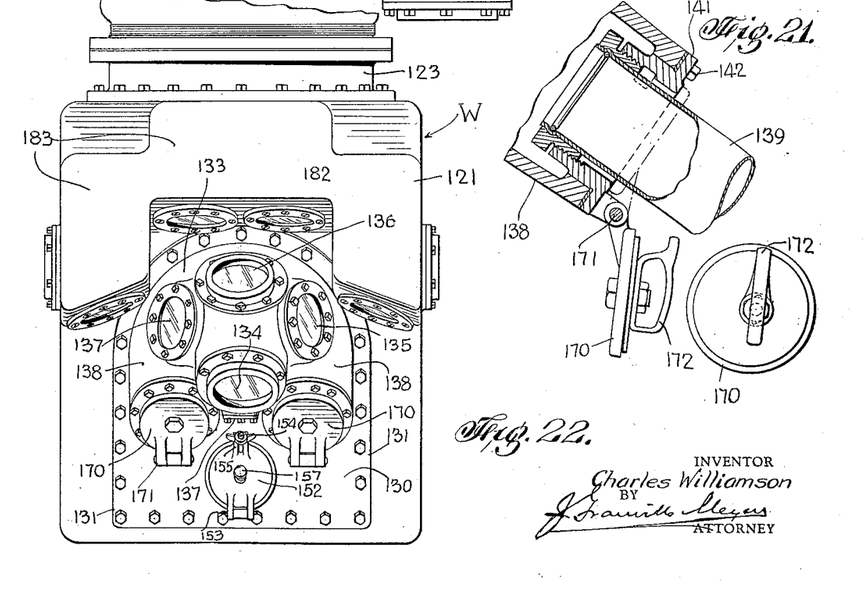
Fig. 21 is an enlarged detail of one form of manipulating structure, namely, an arm sleeve and certain adjacent parts.
Fig. 22 is a front elevation of the working chamber.

Unless the working chamber is used merely for inspection, it is necessary to provide some means by which a workman within the chamber may manipulate the tools or objects in the surrounding water and also means by which outside articles, such as valuables recovered, may be brought into the chamber, or articles such as tools may be passed to the outside of the chamber without admitting any considerable amount of water. Since such means or devices vary greatly for different classes of work, it is desirable to provide the chamber with a detachable front or plate and a number of such plates may be provided having different forms of manipulating devices or other appurtenances so that the chamber is readily adapted for almost any kind of operations merely by substituting one of these front plates for another. Such detachable or interchangeable equipment for the working chamber I identify, for convenience, as an operating unit. Such a unit consists in the present example, of a frame or plate 130 having a peripheral flange 131 for bolting to a flange 132 formed as the outline of an opening in the front lower face of chamber section 121. In the upper part of this frame or plate is formed a part-spherical pocket 133 large enough to freely accommodate the head and shoulders of a workman or inspector and provided with glazed ports 134, 135, 136 and 137, designed to give a practically universal view forward, upward, downward and to right and left of the front face of the chamber. At each side of this ported pocket is a tubular formation or arm-pocket 138, terminating in a flange to which any suitable manipulating device may be secured. Such a device is represented in this case by a sleeve 139 terminating in a mitten or other hand-enclosing formation, the sleeve and mitten being of any suitable flexible and waterproof material such as rubberized fabric for moderate depths, or for greater depths it may consist of an articulated, extensible and contractible frame of metal with watertight sheathing. The particular type of sleeve shown, is secured to the end of arm pocket 138 by a ring 141 and screws 142, Fig. 21.

It is desirable also, to provide means to tightly close the arm extension or pocket 138 when the sleeve is pulled back into the chamber. For this purpose a door 170 is hingedly connected at 171 and is provided with a handle and latch 172 arranged on the inner face of the door when closed. When operations requiring the use of the sleeve for outside manipulations are completed, the sleeve is pulled partially back into the arm extension 138 and the handle of door 170 is swung up, closed and latched.

To permit articles or material to be passed out from or into the working chamber, a water-lock or box 150 is provided having portions projecting outward and inward from the plate or frame of the working unit. The outer end of the box is inclined upward and formed as a seat 151 for a door 152 hingedly connected at 153 and provided with a secure latch such as the swing bolt 154 cooperating with a clevis 155 formed on the door. The periphery of the door is also preferably channeled to accommodate a gasket 156 fitting the conical seat 151 formed in the outer end of the box. A relief valve 157 in the form of a needle valve is placed in the door. On the top of the inner section of the box or trap is formed a door opening provided with a door 160 similar to the outer opening and door but inverted, and this door is provided with a clamping latch 161 and a relief valve 162.

To pass an object, such as a tool, from the inside to the outside of the chamber, outer door 152 is shut and fastened and its relief valve 157 is closed. If the outer door had not been previously opened the box is free of pressure and the inner door 160 may be unlocked and opened. The tool or other object is then placed in the box, the inner door is shut and locked, care being taken to see that its relief valve is closed. The workman, by use of either hand encased in the sleeve or mitten, such as 136, then opens the relief valve 157 in the outer door, whereupon water enters the box until its interior pressure balances the outer pressure. The outer door is then unclamped and opened and the workman reaches in and grasps the tool or other object and removes it for use. To return the tool or bring any other outside object or material into the working chamber, assuming that the outer door is open, this object or material is merely placed in the box; the outer door is then shut and locked and its relief valve is closed. The relief valve in the inner door is then opened and by escape of a small amount of water (or of air, if air was trapped in the upper part of the box) pressure within the box is reduced to that existing in the working chamber; the inner door is then unlocked and opened, and the article or material removed. The principle of this transfer or trap box is adaptable to other uses, for example, it may be made in the form of a large chamber connected to the working chamber by an inner door and having an outer door opening into surrounding water, and by use of such a chamber or caisson a diver may pass from the working chamber into the surrounding water clad in regulation diving costume, and supplied with air either from the working chamber or from the surface. This gives the diver the advantage of working under inspector's direction, also working from a supply or control base which is much nearer the actual work than when he is lowered from a surface ship.

Ample external illumination is provided by electric bulbs located in lamps 180 arranged to co-operate with the inner flanges 181 of glazed ports 182, which are located in projecting or overhanging formations 183 of the working chamber, to throw light downward and outward; and of course, additional lighting or observation ports may be provided, as also lights for the interior, telephones, ventilating apparatus, etc., too numerous to mention.

I claim:

1. A tube for submarine operations comprising a tube of variable length adapted to withstand hydrostatic pressure, and a working chamber connected to the lower end of the tube, said chamber comprising a detachable working unit, said unit being provided with a projecting pocket dimensioned to freely accommodate the head of an operator and having glazed ports therein, arm extensions below said pocket, sleeves secured to said arm extensions and adapted to contain the arms and hands of an operator, doors to close the outer ends of said extensions, each door having means on the inner face thereof to be grasped by the hands of the operator in the arm extensions, whereby to close the doors.

2. A tube for submarine operations comprising a tube of variable length adapted to withstand hydrostatic pressure, and a working chamber connected to the lower end of the tube, said chamber comprising a detachable working unit, said unit being provided with a projecting pocket dimensioned to freely accommodate the head of an operator and having glazed ports therein, arm extensions below said pocket, sleeves secured to said arm extensions and adapted to contain the arms and hands of an operator, and doors to close the outer ends of said extensions, said doors being hingedly connected and having latches and latch handles interiorly located when the doors are closed whereby the doors may be manipulated by use of said sleeves.

3. A collapsible tubular structure for submarine operations, comprising a plurality of sets of articulated links composing a collapsible wall, frames connected to upper and lower ends of the links, and flanges on said frames dimensioned and positioned to limit longitudinal collapse by engagement of central portions of the sets of links with the flanges when confronting ends of the flanges engage with each other.

4. A collapsible tubular structure for submarine operations, comprising a plurality of sets of articulated links composing a collapsible wall, frames connected to upper and lower ends of the links, flanges on said frames dimensioned and positioned to limit longitudinal collapse by engagement of central portions of the sets of links with the flanges when confronting ends of the flanges engage with each other, and mating formations on the ends of the flanges to provide a watertight seal.

5. Frame structures for submarine tubes of the class described, arranged as end members of working sections of such tubes, each frame having means for supporting link pivot blocks, and means for connecting two frames together in the formation of a tube composed of a plurality of said working sections, said means including an end face of one of the frames having a channel and a compressible gasket therein and the end of the complemental frame having a bead to co-operate with said gasket to form a watertight seal.

6. Apparatus for submarine operations, comprising a tube, a working chamber connected to the lower end thereof, and a float connected to the upper end of the tube, said tube comprising a plurality of detachably connected units, different ones of which have their weight differently related to their cubic volume, whereby the weight of the tube per axial foot is different in different longitudinal portions thereof.

7. In a tube for submarine operations, a framework including a plurality of rigid rings, each relatively wide in a radial direction, and a plurality of linked members for connecting adjacent rings and connected together to fold inwardly between the rings, the relative length of the members and width of the rings being such that all of each member is between adjacent rings when collapsed.

8. In a tube for submarine operations, a framework including a plurality of rigid rings, each relatively wide in a radial direction, and a plurality of linked members for connecting adjacent rings and connected together to fold inwardly between the rings, each member consisting of three links, the end links having means for detachably engaging the rings, and of a length less than the width of the rings, whereby to be entirely between the rings when collapsed.

9. In a tube for submarine operations, a framework including a plurality of rigid rings, each relatively wide in a radial direction, and a plurality of linked members for connecting adjacent rings and connected together to hold inwardly between the rings, certain of the rings having annular coaxial webs abutting, and abutted by the linked members to limit the collapse of the linked members.

10. A tube for submarine operations arranged to withstand hydrostatic pressure, and constructed of a plurality of sets of detachably connected units, the units of one set being collapsible longitudinally of the tube, and the units of the other set being longitudinally rigid so that the weight of selected parts of the tube may be varied by the insertion of units of the last named set.

11. A tube for submarine operations, composed of a multiplicity of units of different types, each unit being adapted for connection to another of the same or different type, and the tube including units which are collapsible longitudinally of the tube, and which have means for restricting the amount of collapse in such direction, so that the weight of selected parts of the tube may be varied by the insertion of units of the last named set all of the units also being constructed and arranged for assembly in working sections, each composed of a plurality of connected units, the working sections having end members adapted for detachable connection to complemental end members of other sections.

12. A tube for submarine operations of variable length and adapted to withstand hydrostatic pressure, said tube composed of units of different types, sundry of which are collapsible longitudinally of the tube and have means restricting the amount of collapse, so that the weight of selected parts of the tube may be varied by the insertion of units of the last named set and a working chamber detachably connected with the lowermost unit of the tube, enabling interchange of working units for different classes of submarine operations.

13. A tube for submarine operations of variable length and adapted to withstand hydrostatic pressure, said tube composed of units of different types, sundry of which are collapsible longitudinally of the tube and have means restricting the amount of collapse, so that the weight of selected parts of the tube may be varied by the insertion of units of the last named set and a working chamber detachably connected to the lower end of the tube, said chamber having means for enabling the grasping of toools outside the chamber by a worker within the chamber, and other means enabling transfer of the tools from and to the chamber.

14. A tube for submarine operations of variable length and adapted to withstand hydrostatic pressure, said tube composed of units of different types, sundry of which are collapsible longitudinally of the tube and have means restricting the amount of collapse, so that the weight of selected parts of the tube may be varied by the insertion of units of the last named set and a working chamber detachably connected to the lower end of the tube, said chamber having means for enabling the grasping of tools outside the chamber by a worker within the chamber, and other means enabling transfer of the tools from and to the chamber, said chamber having also a projecting pocket dimensioned to freely accommodate the head of a worker in the chamber, and having glazed ports positioned to enable inspection of the work exterior to the chamber.

15. A tube for submarine operations of variable length and adapted to withstand hydrostatic pressure, said tube composed of units of different types, sundry of which are collapsible longitudinally of the tube and have means restricting the amount of collapse, so that the weight of selected parts of the tube may be varied by the insertion of units of the last named set and a working chamber detachably connected to the lower end of the tube, said chamber having means for enabling the grasping of tools outside the chamber by a worker within the chamber, and other means enabling transfer of the tools from and to the chamber, said last named means comprising a trap box having openings internal of and external to the chamber, a removable door for each opening, a relief valve affording communication between the box and the exterior of the chamber, and another relief valve affording communication between the box and the interior of the chamber.

16. A tube for submarine operations arranged to withstand hydrostatic pressure, including sections which are collapsible longitudinally of the tube, and sections in which the amount of collapse is restricted, said first named sections being interspersed among the last named sections in number and at selected points to provide for selected weights of the tube per axial foot at selected points.

17. A tube for submarine operations, arranged to withstand hydrostatic pressure, including sections or units, sundry of which are collapsible longitudinally of the tube, others of which in which the amount of collapse is restricted, said first named sections or units being adapted to be interspersed among the last named sections, in such number, and at such points as to provide for selected weights of the tube per axial foot throughout its length.

18. A tube for submarine operation including a plurality of sections some of which have laterally collapsible wall members, upper and lower frames on said sections, said wall members being pivotally connected to said frames, abutments disposed between said frames and located in the direction of collapsing movement of said wall members to limit the amount of collapse of said wall members, and water-tight sealing means for said sections.

Signed at New York, in the county of New York and State of New York this 1st day of April, A. D. 1927.

CHARLES WILLIAMSON.